J. LUX.
Cultivators.

No. 154,404.  Patented Aug. 25, 1874.

Witnesses:  Inventor:

UNITED STATES PATENT OFFICE.

JOHN LUX, OF HOPKINTON, IOWA.

IMPROVEMENT IN CULTIVATORS.

Specification forming part of Letters Patent No. 154,404, dated August 25, 1874; application filed March 21, 1874.

*To all whom it may concern:*

Be it known that I, JOHN LUX, of Hopkinton, in the county of Delaware and State of Iowa, have invented certain new and useful Improvements in Cultivators; and I do hereby declare the following to be a full, clear, and exact description of the invention, such as will enable others skilled in the art to which it pertains to make and use it, reference being had to the accompanying drawings, which form part of this specification.

My improvement relates to that class of wheel-cultivators which have hinged to the main frame, carrying the wheels, two independent auxiliary frames, carrying the plows or shovels; and it consists in the combination of sliding sheaves and pulleys, arranged to allow the equalizing draft-chain to be used also for the purpose of equalizing or balancing the weight of the driver on his seat, with double slotted pendants or arms, in which said sheaves and pulleys are adjustably inserted, all as hereinafter more fully set forth.

Figure 1:
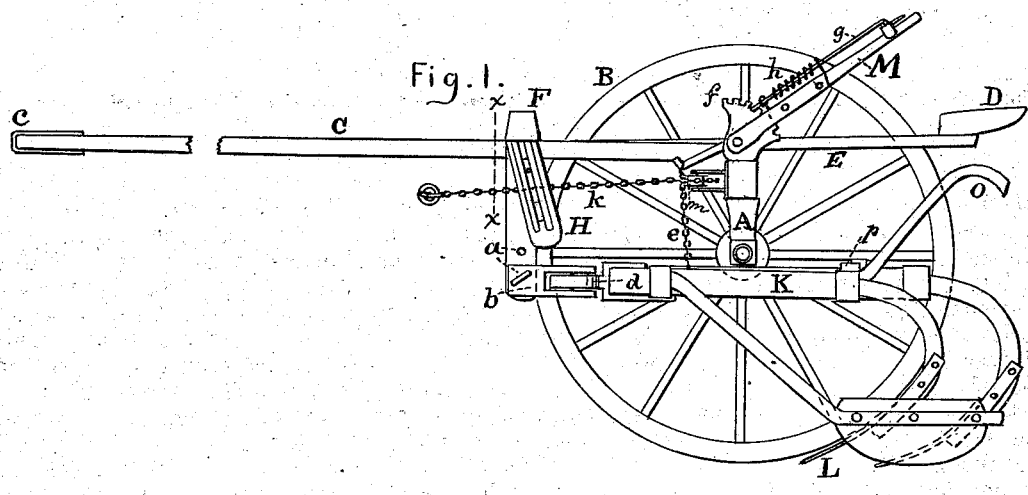
Figure 2:
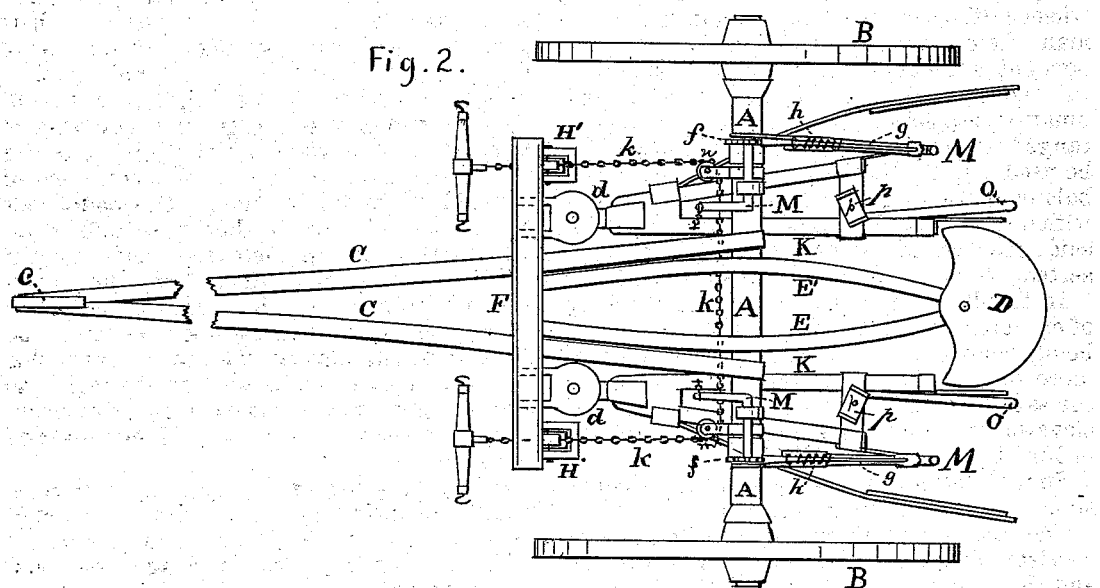

In the drawing, Figure 1 is a side elevation of my improved cultivator, one of the wheels being removed, so as to show its construction more fully. Fig. 2 is a plan or top view of the same; and Fig. 3 is a transverse sectional elevation in a plane indicated by the line $x\ x$ in Fig. 1.

Similar letters of reference indicate corresponding parts in all the figures.

The main frame of my improved cultivator consists of the axle A, carrying the wheels B, and the pole-beams C, which latter are rigidly attached to the axle at their rear ends, and, extending forward in converging lines, finally unite, and receive the pole-iron $c$. The seat D rests upon the two converging seat-bars E and E', which are rigidly attached to the axle, and extend forward to the cross-beam F, to the under side of which their ends are firmly secured. The cross-beam F rests upon, and is secured to, the pole-beams C C, as shown in Figs. 1 and 2.

Figure 3:
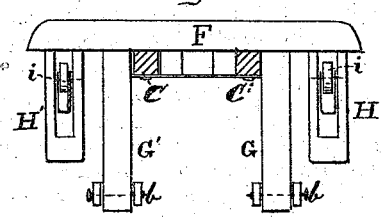

By reference to Fig. 3, it will be seen that the cross-beam F has four arms extending downward at right angles. Two of these arms, G G, nearest the pole-beams, are of equal length, and extend below the outside shorter arms H H', the latter being also of equal length. The inner arms, G G', are provided, at their lower ends, with a series of holes, $a$, which, in combination with suitable bolts or pins, serve to hold the joints $b$, to which the auxiliary shovel-frames K K are attached, in position. By this arrangement the frames K K may be raised or lowered on the arms G G' at will. The frames K K are attached to the joints $b$ by intervening lateral joints $d\ d$, so that the said frames, and with them the shovels L, may move sidewise as well as up and down. To facilitate the motion of the said shovel-frames, and assist in their operation, they are suspended, in the rear of the joints $d\ b$, to chains $e$, which are attached to the short arms of the angular levers M. The fulcrum of these angular levers rests in bearings on the axle A, which form the center of the segmental racks $f$. The long arms of the said levers are provided with slender rods or "stoppers" $g$, which slide in suitable bearings thereon, and at their lower ends are provided with springs $h$, which force the lowermost projections into the serrated periphery of the racks $f$. A pressure upon the top of the lever M, acting also on the rod $g$, draws this upward, and releases its hold on the rack $f$, so that the lever may be moved forward or backward, and the frames K, accordingly, lowered or raised.

When the grasp at the top of lever M is released, the spring $h$ will force the lower end of rod $g$ into one of the notches in rack $f$, and it will remain in that position until again changed by the driver.

The two outside shorter arms H H', which extend downward from the cross-beam F, are slotted (see Fig. 3) to afford space for the sliding sheaves with their pulleys $i$. Through these sheaves, and under the pulleys, passes the draft-equalizing chain $k$, as shown more clearly in the plan view, Fig. 2. This chain, beginning with one of the whiffletrees, passes rearward, through sheave and slot, under pulley in one of the arms H, then back to the axle, and through the pulley $m$; then, parallel with the axle, to the other pulley, $n$, and then forward again through sheave in the other arm, H', and to the other whiffletree.

By this device the draft of the team is not only equalized, but, by raising or lowering the sheaves and their pulleys $i$, (which may be fixed at any point in the slots in the arms H by means of set-screws, pins, or in any other suitable manner,) the draft may be made to equalize or balance the weight of the driver in his seat D. The greater the weight at D the higher should the sheaves be raised; while, when there is no weight at D, or only a very light one, the sheaves should be lowered, so as to cause the strain of the draft to be upward, counteracting the downward tendency of the shovels.

At the rear end of each of the frames K is attached the upward-projecting handle O, by means of which the shovel-frames may be guided, when the operator is on foot, in the same manner as a plow is guided. When, on the contrary, the driver is occupying the seat D, his legs will straddle these levers, the feet resting on the plates $p$, fastened to the top of the rear end of the shovel-frames, so that, by a movement of the knees, he may move the levers O, and with them the frames K, nearer together.

I am aware that it is not new to arrange a draft-equalizing device so that it may also equalize or balance the weight of the driver; nor do I claim, broadly, the arrangement of pulleys in slotted arms or pendants; but

What I claim, and desire to secure by Letters Patent, is—

In a wheel-cultivator, the laterally and longitudinally slotted vertical pendants H, in combination with the sliding sheaves and pulleys $i$, substantially as set forth.

In testimony that I claim the foregoing I have hereunto set my hand this 21st day of February, 1874.

JOHN LUX.

Witnesses:
 JOHN YOUNG,
 HENRY YOUNG.